(12) United States Patent
Craft et al.

(10) Patent No.: US 7,003,605 B2
(45) Date of Patent: Feb. 21, 2006

(54) METHOD AND SYSTEM FOR AN IMPROVED DIFFERENTIAL FORM OF TRANSITIONAL CODING

(75) Inventors: David John Craft, Austin, TX (US); Charles Ray Johns, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 10/242,522

(22) Filed: Sep. 12, 2002

(65) Prior Publication Data
US 2004/0054830 A1 Mar. 18, 2004

(51) Int. Cl.
*G06F 13/42* (2006.01)
(52) U.S. Cl. ............... 710/106; 710/65; 710/105
(58) Field of Classification Search ............ 710/107, 710/105, 305; 326/21–34
See application file for complete search history.

(56) References Cited

U.S. PATENT DOCUMENTS

| | | | | |
|---|---|---|---|---|
| 3,697,768 | A * | 10/1972 | Johnston | 307/31 |
| 4,667,337 | A * | 5/1987 | Fletcher | 377/41 |
| 5,025,256 | A * | 6/1991 | Stevens | 341/59 |
| 5,142,167 | A * | 8/1992 | Temple et al. | 326/26 |
| 5,369,640 | A * | 11/1994 | Watson et al. | 714/700 |
| 5,574,475 | A * | 11/1996 | Callahan et al. | 345/100 |
| 5,586,046 | A * | 12/1996 | Feldbaumer et al. | 716/18 |
| 5,890,005 | A * | 3/1999 | Lindholm | 713/320 |
| 6,275,884 | B1 | 8/2001 | Craft et al. | |
| 6,304,933 | B1 * | 10/2001 | Craft | 710/114 |
| 6,489,900 | B1 * | 12/2002 | Shin et al. | 341/50 |
| 6,553,445 | B1 * | 4/2003 | Drapkin et al. | 710/305 |
| 6,665,161 | B1 * | 12/2003 | Brady et al. | 361/78 |
| 6,721,918 | B1 * | 4/2004 | Self et al. | 714/800 |
| 6,732,214 | B1 * | 5/2004 | Cohen et al. | 710/305 |
| 2003/0099300 | A1 * | 5/2003 | Anders et al. | 375/259 |

OTHER PUBLICATIONS

Ramprasad et al.; "Achievable Bounds On Signal Transition Activity"; IEEE/ACM International Conference on Computer-Aided Design; Nov. 1997; IEEE.*
Benini et al.; "Address Bus Encoding Techniques for System-Level Power Optimization"; Design, Automation and Test in Europe; Feb. 1998; IEEE.*
Sotiriadis et al.; "Bus Energy Minimization by Transition Pattern Coding (TPC) in Deep Sub-Micron Technologies"; IEEE/ACM International Conference on Computer-Aided Design; Nov. 2000; IEEE.*
Sundararajan et al.; "Reducing Bus Transition Activity by Limited Weight Coding With Codeword Slimming"; ACM Great Lakes Symposium on VLSI; Mar. 2000; ACM.*
The Digital Display Working Group Promoters; "Digital Visual Interface: DVI"; The Digital Display Working Group Promoters; Apr. 2, 1999; Revision 1.0; pp. 24-32.*

(Continued)

*Primary Examiner*—Paul R. Myers
*Assistant Examiner*—Ryan Stiglic
(74) *Attorney, Agent, or Firm*—Carr LLP; Diana R. Gerhardt

(57) ABSTRACT

The present invention provides employing differential transitional encoding with a differential bus. Employing the differential transitional encoding comprises dividing the differential bus into one or more groups comprising four bus lines. Employment of the differential bus also comprises asserting half the bus lines of a group during a bus data transfer, thereby defining an asserted set of bus lines and a de-asserted set of bus lines. The method and system further comprises transmitting data by differentially driving two of the bus lines, one bus line per set, by de-asserting one of the bus lines of the asserted set, and asserting one of the bus lines of the de-asserted set.

21 Claims, 9 Drawing Sheets

OTHER PUBLICATIONS

"Single-Ended vs. Differential Inputs"; <http://www.omega-.com/techref/das/se-differential.htm>; 2001.*

Cadence Design Systems Inc.; "Inside Differential Signals?"; Cadence Design Systems; Dec. 2001.*

International Business Machines Corporation; "Hybrid transitional coding of wide on-chip busses"; Kenneth Mason Publications Ltdl; Nov. 2001.*

The SCSI Trade Association; "Ultra2 SCSI—The Evolution Continues"; The SCSI Trade Association; Nov. 1996.*

Craft, David J.; "Improved CMOS Core Interconnect Approach for Advanced SoC Application"; *Intellectual Property Conference*; 1999; IBM Microelectronics Division, Austin, Texas.

Craft, David J.; Pending U.S. Patent Application entitled "Method and Apparatus for Adaptively Compensating Skews During Data Transmission on a Bus"; U.S. Appl. No. 09/804,799,; filed Mar. 14, 2001.

* cited by examiner

METHOD AND SYSTEM FOR AN IMPROVED DIFFERENTIAL FORM OF TRANSITIONAL CODING

CROSS-REFERENCED APPLICATION

This application cross-references U.S. patent application Ser. No. 10/242,522 of David John Craft and Charles Ray Johns entitled "Dynamic System Bus Encryption Using Improved Differential Transitional Encoding", filed concurrently herewith.

TECHNICAL FIELD

The invention relates generally to a bus data transfer system and, more particularly, to a method and an apparatus employing a differential form of Transitional Coding.

BACKGROUND

The greatly increased circuit density and speeds available within today's microchips has in turn resulted in correspondingly enhanced on-chip functional capability and performance. However, these enhancements have themselves begun to raise certain other concerns, such as the performance of conventional data bus techniques. The much higher off-chip input and output bandwidths (that is, data transfers to and from the microchip), which are necessary to make effective use of such greatly enhanced on-chip functional capability, are becoming much more difficult to provide.

One solution to this dilemma is to employ a wider bus data path. However, the increased numbers of bus data driver circuits required by this approach cause further problems for the chip designer. Depending on how different the data pattern being transferred in a given bus cycle is from that of the preceding bus cycle, anywhere between all and none of the data bus drivers may be required to change the voltage levels of their respective data bus lines. Since each data bus line may have a significant load capacitance, there could both be a significant peak total driver current requirement (if all drivers simultaneously and rapidly attempt to change the voltage levels of their bus lines), and significant variations in such driver current demand from one bus cycle to the next (if all switch in one cycle, for example, and none switch in the next). It becomes increasingly difficult to provide adequate power distribution to large numbers of such driver circuits, as the inductance and resistance of the on-chip power supply and ground grids feeding them results in significant dynamic bus data-dependent voltage shifts. These in turn are often coupled as noise to other circuitry on the chip.

One approach to this problem is to use driver circuits designed to limit slew rates, that is, how fast they change the voltage on their associated data bus line loads. Another is to "stagger" the driver circuit operation, so they do not all attempt to change their associated data bus lines at precisely the same instant. These methods are both effective, but at the cost of a longer bus cycle time, and slower data transfer rates.

Another approach is to use differential transmission, in which two wires are used for each data bus bit line. A constant current is then diverted down one driver circuit path or another to produce the differential signal. This typically results in lower ground and supply grid transients on-chip at the driver, with improved noise immunity at the receiver chip, since only the difference between the two data bus bit line voltage levels is significant to the differential receiver. This in turn allows lower voltage signal level swings to be used on the bus lines, which then reduces on-chip driver current demand for a given capacitive bus loading. Coupled noise within the data bus lines is also reduced, as is emitted electromagnetic radiation. This technique is generally referred to as LVDS (Low Voltage Differential Signal levels), to distinguish it from the single-ended type of bus where one wire is used to transmit each data bit, and the voltage levels used are typically the same as the logic circuitry.

Generally, the latter technique is used at this time for bus connections within a chip, and either the single-ended or LVDS methods for transmission between chips, depending on the speeds required, and the distance/load capacitance presented by the data bus lines.

U.S. Pat. No. 6,304,933 teaches a further improvement to the single-ended technique, which is called "Transitional Coding". In this patent, data is transmitted through the activation or de-activation of one of four bus lines, each transition of one of the four bus lines representing a unique 2-bit binary value. The result is a reduced variation in driver current demand compared to a conventional single-ended approach, because two consecutive single-wire transitions are always required to transmit 4 bits of information, compared to anywhere from 0 to 4 simultaneous wire transitions over the same 4 wires if employed as part of a conventional single-ended data bus. In addition, the transitions are self-clocking, and can therefore be somewhat faster, especially in an on-chip environment.

Even using the LVDS technique, however, the numbers of driver circuits required for the increasingly wide bus data paths needed to supply adequate data transfer rates still present a significant on-chip simultaneous switching problem. The design of the bus system must allow for the possibility of each bus cycle transferring the inverse data pattern to that of the preceding one. All or none of the data lines might thus potentially be transitioned each cycle, and some of these might be differentially driven in the opposite sense to their adjacent neighbors, thereby increasing the effective inter-signal line load capacitance.

Variance in the number of switching bus lines resulting from such transitions frequently creates unfavorable conditions for receiving the encoded data, for such reasons as cross-coupling between lines, ground power voltage variations, noise spikes, electromagnetic radiation, and so on.

Therefore, there is a need for a method and an apparatus for differentially transmitting data on a bus that overcomes the limitations of conventional systems.

SUMMARY

The present invention provides a differential transitional coding for a differential bus. A bus is divided into one or more groups comprising four bus lines, half of which form a set of asserted bus lines, and half of which form a de-asserted set of bus lines. The transitional coding further comprises transferring data by differentially driving two of the bus lines, one bus line per set, by de-asserting one of the bus lines of the asserted set, and asserting one of the bus lines of the de-asserted set.

BRIEF DESCRIPTION OF THE DRAWINGS

For a more complete understanding of the present invention, and the advantages thereof, reference is now made to the following Detailed Description, taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or a microprocessor executing firmware, or some combination thereof. In one embodiment, dedicated integrated logic circuits that are encoded to perform such functions are used. In other embodiments, functions are performed by a processor, such as a computer or an electronic data processor, in accordance with code, such as computer program code, software, and/or integrated circuits that are coded to perform such functions, unless indicated otherwise.

Figure 1:
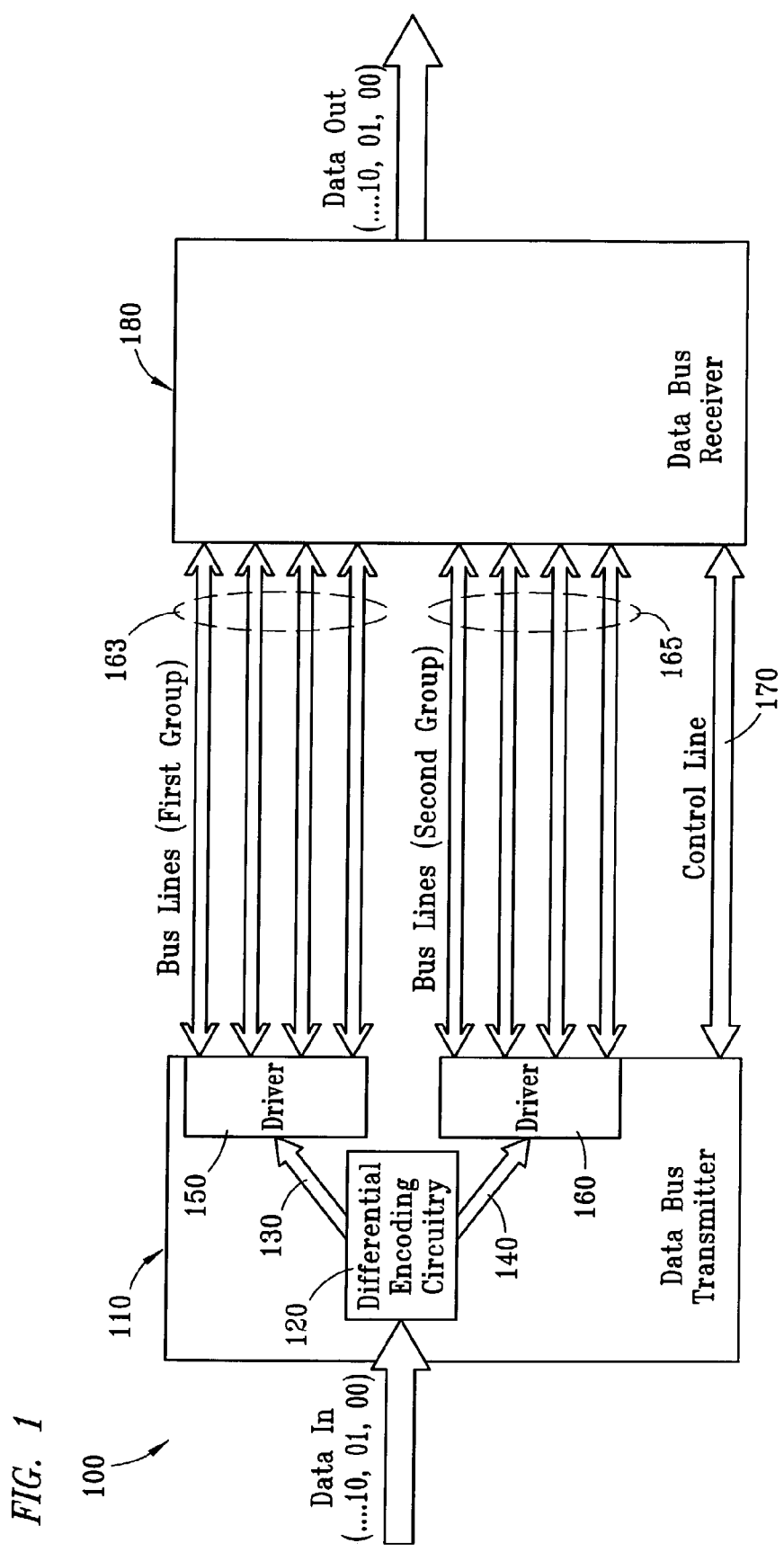
FIG. 1 schematically depicts a bus system adapted to employ a differential form of transitional coding.

Referring to FIG. 1, the reference numeral 100 generally designates a differential bus system. The system 100 is adapted to receive input data into a transmitter 110. The transmitter 110 comprises differential encoding circuitry 120, data paths 130, 140 and bus drivers 150, 160. The differential encoding circuitry 120 can comprise hardware dedicated logic circuits, software, a microprocessor executing firmware, and so on. The bus driver 150 is coupled to a group of bus lines 163, and the bus driver 160 is coupled to a group of bus lines 165. Both groups of bus lines 163, 165 are coupled to a data bus receiver 180. The data bus receiver 180 and the data bus transmitter 110 exchange control-line information through the control line 170 to the transmitter 110. The data bus receiver 180 receives the differential coding and outputs the decoded data as data out. Although the data bus receiver 180 is described as comprising logic elements in FIGS. 3A-3E, those skilled in the art will understand that the data bus receiver 180 can also comprise hardware dedicated logic circuits, software, a microprocessor executing firmware, and so on, and that the present invention is not limited to a particular embodiment.

The bus lines are divided into one or more groups, the first bus line group 163 and, in a further embodiment, the second bus line group 165. Each of the bus line groups are functionally divided into two sets. The first asserted set comprises just half of the group bus lines, and the second de-asserted set comprises the remainder. Generally, an asserted bus line has a "1", or "high" voltage, output, and a de-asserted bus line has a "0", or "low" voltage. The state of group of bus lines can be described by a binary field or its value. In other words, a four-line group of wires might be "0,0,1,1" for value "3," and so on.

The system 100 executes a data bus transfer cycle, after determining both sets of bus lines. Generally, a bus transfer cycle comprises the differential bus system 100 transitioning and asserting (that is, making the voltage higher) on one member of the set of the bus lines which were previously de-asserted. A data bus transfer cycle further comprises the system 100 de-asserting one member of the asserted set and substantially simultaneously asserting one member of the de-asserted set, thereby exchanging one member of each set for another. An encoding rule employed by the system 100 is that there shall always be half of the bus lines asserted and half de-asserted within each group. In a further embodiment, a bus line group comprises six bus lines. In a still further embodiment, the system 100 comprises a plurality of groups.

For instance, in a 4-wire group, there are two possible bus lines within the de-asserted set, and two possible bus lines within the asserted set. In a bus data transfer cycle, one bus line of the de-asserted set will be asserted and one bus line of the asserted set will be de-asserted. Therefore, there are a total of 4 separate ways to transition from any given state of the group to any other allowable state for a 4-wire group. Each unique transition thereby transmits a packet of two bits of information, {(00); (01); (10); (11)} to the receiver.

For example, in a 4-wire group there will always be two bus lines that are asserted and two bus lines that are de-asserted. Denoting asserted lines as "1", and the de-asserted lines are "0", allowable states are (0,0,1,1); (0,1,0,1); (0,1,1,0); (1,0,0,1); (1,0,1,0); and (1,1,0,0). In the next bus data transfer cycle, one member of each set (that is, the set of asserted bus lines and the set of unasserted bus lines) will change from a de-asserted state to an asserted state, and from an asserted state to a de-asserted state, respectively. The unique transition from one state to another state (for example from a (0,1,0,1) state to a (0,1,1,0) state), is associated with a 2 bit value, such as "01." Changing from a (1,1,0,0) state to a (0,1,0,1) correlates to a bit value of "00." The value to be conveyed from the transmitter 110 to the receiver 180 comprises a function of the change of states, not just of the new state itself.

In FIG. 1, when the data bus transmitter 110 receives input data, the input data is first acquired by the differential encoding circuitry 120, which also has access to the pre-transition states for each group of bus lines 163, 165. This circuitry 120 determines the post-transition states of the groups of bus lines 163 and 165 as a function of the input data and the pre-transfer states. Then, the circuitry 120 asserts and de-asserts the appropriate pair of bus lines within each of the groups 163 and 165 appropriate for the next bus data transfer cycle through the data paths 130, 140 to the bus drivers 150, 160.

The bus receiver 180 receives the bus line groups 163 and 165. The bus receiver 180 then compares the voltage on the bus lines to other bus lines within that group and the state (that is, the asserted and de-asserted bus lines) of the previous data bus cycle. The data out, decoded by the data bus receiver 180, was decoded as a function of both the pre-transition state and the post-transition state of the bus line group 163. In a further embodiment, the control line 170 is employed to indicate to the encoding circuitry 120 that the receiver has decoded a plurality of two-bit data packets, such as received over bus line groups 163 and 165.

Below is table showing one embodiment of transitions for a 4-wire system from state to state. The first bus line of a group is bus line "0", and the last bus line is line "3".

TABLE 1

Example State Map for Encoding

| Pre-Transitional State (As demonstrated by asserted and de-asserted bus lines) | | Post-Transitional State (As demonstrated by transitions and non-transitions of bus lines) | | Asserted Bus Line Numbers | Decoded Data |
|---|---|---|---|---|---|
| 0x3 | (0011) | 0x5 | (0101) | +1, −2 | 0 0 |
| | | 0x6 | (0110) | +1, −3 | 0 1 |
| | | 0x9 | (1001) | +0, −2 | 1 0 |
| | | 0xA | (1010) | +0, −3 | 1 1 |
| 0x5 | (0101) | 0X3 | (0011) | +2, −1 | 0 0 |
| | | 0x6 | (0110) | +2, −3 | 0 1 |
| | | 0x9 | (1001) | +0, −1 | 1 0 |
| | | 0xC | (1100) | +0, −3 | 1 1 |
| 0x6 | (0110) | 0X3 | (0011) | +3, −1 | 0 0 |
| | | 0x5 | (0101) | +3, −2 | 0 1 |
| | | 0xA | (1010) | +0, −1 | 1 0 |
| | | 0xC | (1100) | +0, −2 | 1 1 |
| 0x9 | (1001) | 0X3 | (0011) | +2, −0 | 0 0 |
| | | 0x5 | (0101) | +1, −0 | 0 1 |
| | | 0xA | (1010) | +2, −3 | 1 0 |
| | | 0xC | (1100) | +1, −3 | 1 1 |
| 0xA | (1010) | 0X3 | (0011) | +3, −0 | 0 0 |
| | | 0x6 | (0110) | +1, −0 | 0 1 |
| | | 0x9 | (1001) | +3, −2 | 1 0 |
| | | 0xC | (1100) | +1, −2 | 1 1 |
| 0xC | (1100) | 0x5 | (0101) | +3, −0 | 0 0 |
| | | 0x6 | (0110) | +2, −0 | 0 1 |
| | | 0x9 | (1001) | +3, −1 | 1 0 |
| | | 0xA | (1010) | +2, −1 | 1 1 |

In one embodiment, the data bus receiver 180 compares the difference between the bus lines of a bus line group rather than comparing the voltage to a lesser threshold voltage, such as 5 volts, to denote an asserted line and an arbitrary low threshold voltage, such as ground or 0.5 volts, or some other low voltage. Therefore, the data bus receiver 180 has improved voltage spike immunity and other advantages associated with a high common-mode rejection ratio. In one embodiment of the system 100, signal propagation for skew assertion and de-assertion times are measured and compensated. The system 100 can be either external or internal to an integrated circuit chip.

Figure 2:
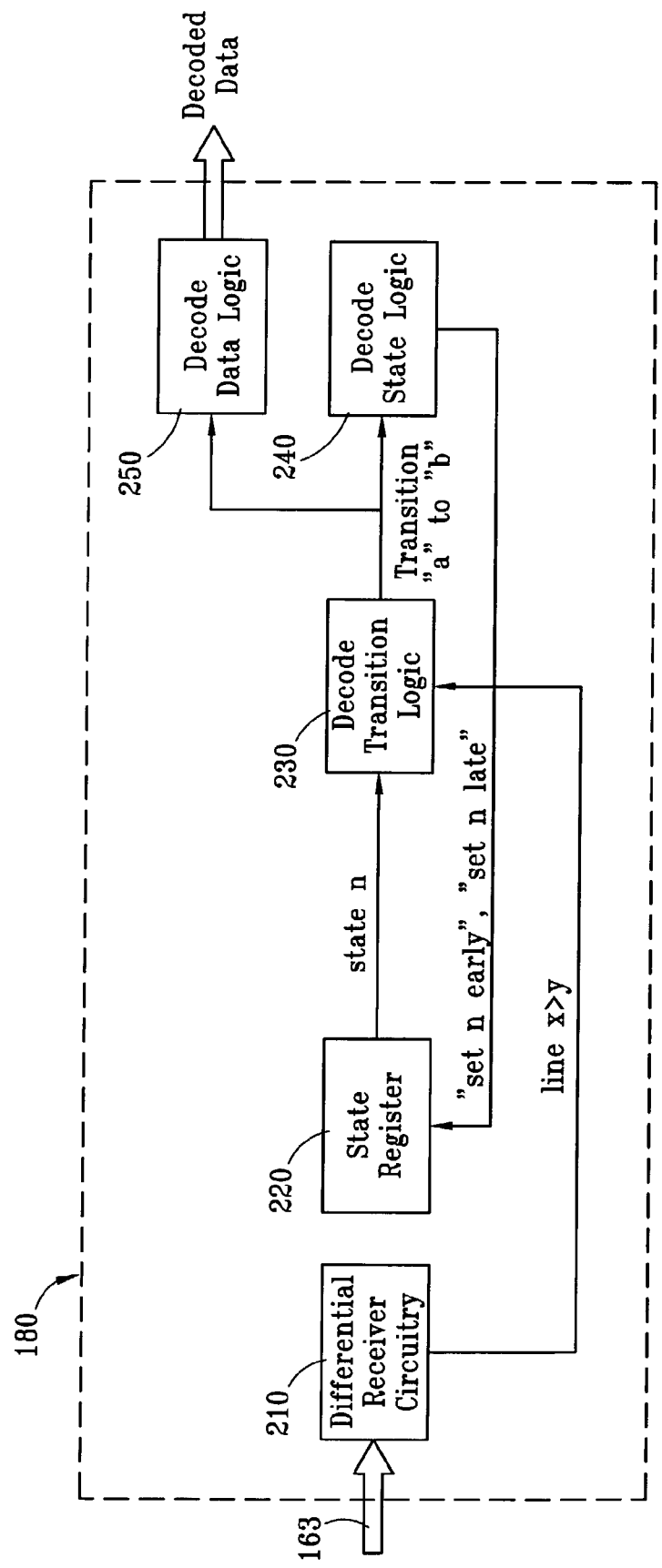
FIG. 2 schematically depicts a system-level diagram of a receiver employed in differential coding.

Turning now to FIG. 2, depicted is a system-level diagram of a receiver employed in transitional coding. Generally, the receiver 180 receives differentially encoded data through the bus line group 163. The differentially encoded data is input into the differential receiver circuitry 210. In the transitional receiver circuitry 210, comparisons are made between the voltage levels of various input bus lines of the bus line group 163.

These bus line voltage comparisons are then input into the decode transition logic 230. The decode transition logic 230 also takes as input a pre-transition state, as stored in a state register 220. The decode transition logic 230 determines whether a transition has been made from an pre-transition state, as stored in the state register 220, to a post-transition state.

If the decode and transition logic 230 determines that no new transition has been made, then the decode transition logic does not output a new signal. However, if the decode transition logic 230 does determine that a state transition has occurred, then the decode transition logic 230 notifies the decode state logic 240 and the decode data logic 250 of the specific transition. In a further embodiment, the decode transition logic 230 receives a state clock signal from the decode state logic 240.

Within the decode state logic 240, the specific transition from pre-transition state to post-transition state is decoded and determined. In other words, the decode transition logic 230 determines the post-transition state, such as (0,0,1,1), (1,0,1,0), and so on. This post-transition state is then input into the state register 220, and is now the stored system state by which further transitions are compared. Within the decode data logic 250, the system state transition is decoded into its corresponding "00", "01", "10" or "11" data Decoding the transitioning of the bus lines of the group 163 by the receiver 200 comprises asynchronous switching. The data bus receiver 180 can process data as fast as it is sent by the data bus transmitter 110. In other words, every time the necessary two transitions (that is, one voltage assertion and one voltage de-assertion per set), are made, the receiver 180 resets itself, and is ready to receive the next assertion and de-assertion. In a further embodiment, a control line 270 is employable to signal the data bus transmitter 160 when a plurality of bus lines 163, 165 have all been decoded.

Generally, FIGS. 3A–3E depict stages of a data bus receiver 180, the differential receiver 210, the state register 220, the decode transition logic 230, the decode state logic 240, and the decode data logic 250, respectively.

Figure 3A:
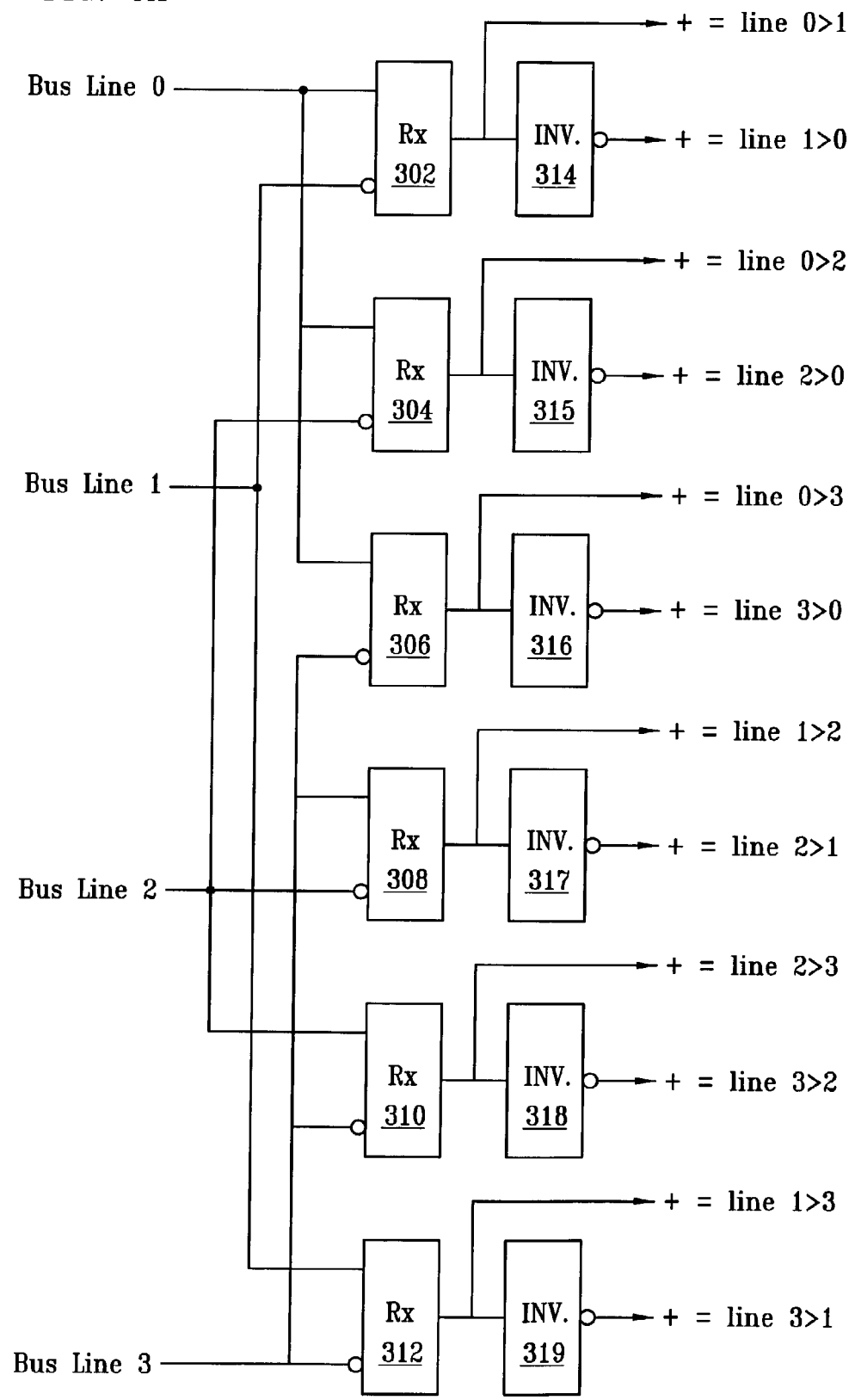
FIG. 3A schematically depicts differential receiver circuitry employable with differential transitional coding.

Turning now to FIG. 3A, the differential receiver circuitry 210 comprises differential amplifiers 302, 304, 306, 308, 310, and 312. As is understood by those of skill in the art, if the non-inverting input of a differential amplifier is higher than the inverting input, the differential amplifier outputs a "high" comparison signal. If the non-inverting input is lower than the inverting input, the differential amplifier outputs a "low" comparison signal.

Generally, all four lines of the bus line group 163, consisting of bus line 0, bus line 1, bus line 2, and bus line 3, are routed into the appropriate differential amplifiers. As each differential amplifier has both an inverting and non-inverting output, all functional combinations of the bus lines are functionally compared by the various differential amplifiers. For instance, if the bus-line state changes from (0,0,1,1) to (0,1,0,1), the voltage of bus line 1 is now greater than the bus line 3, whereas before, the voltage of bus line 3 was greater than the voltage of bus line 1.

For example, in the illustrated embodiment, bus-line 0 is compared to bus line 1 by the differential amplifier 302. If the voltage on bus line 0 is greater than the voltage on bus-line 1, the differential amplifier 302 outputs a positive signal. If the voltage on bus line 1 is lower than the voltage on bus line 0, the differential amplifier 305 outputs a negative signal. Similar comparisons are performed by the other differential amplifiers 304, 306, 308, 310, and 312 upon the various combinations of bus line inputs. The data bus transmitter 110 has similar logic to drive the bus lines of the groups 163, 165.

The differential amplifiers 302, 304, 306, 308, and 310 output a value that represents whether a first bus line, such as bus line "0", is greater than a second bus line, such as bus line "1", denoted by the equation "+=line0>1". This value is inverted by the inverters 314, 315, 316, 317, 318, 319, to determine whether the second bus line is greater than the first bus line, denoted by the equation "+=line1>0". The differential receiver circuitry 210 of receiver 180 outputs both the inverted and non-inverted differential signals.

Figure 3B:
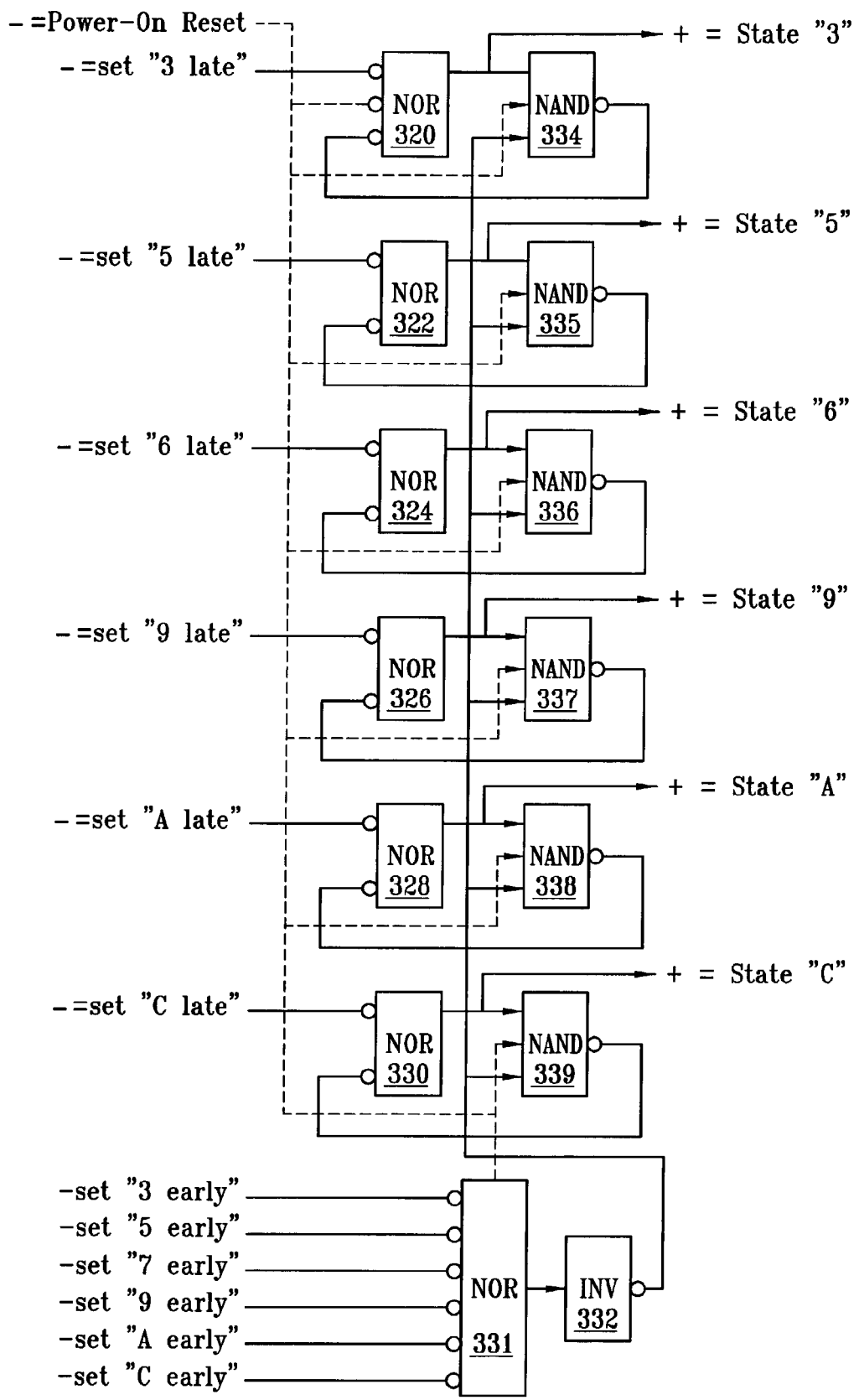
FIG. 3B schematically depicts control logic and state registers employable with differential transitional coding.

Turning now to FIG. 3B, schematically illustrated are control logic and state registers employable with differential transitional coding within the state register 220. In FIG. 3B, indicia for sets "3" (0011), "5" (0101), "6" (0110), "9" (1001), "A" (1010), and "C" (1100) are input in NOR gates 320, 322, 324, 326, 328, 330, one unique set per NOR gate. Generally, a set occurs when the data bus receiver 180 transitions from a pre-transition differential input state to a post-transitional state. This new state, the post-transitional state, then becomes the pre-transitional input state in a later bus data transfer cycle. In FIG. 3B, the "set" is illustrated as negative if true, and positive if false, for any set function. Each NOR gate has inverted inputs, thereby converting a "negative" true into a positive true for a given NOR gate.

A negative power-on reset input is coupled into the input of the NOR gate 320 through an inverter. Typically, the negative power-on reset input comprises the default state when the bus receiver 180 is first powered on, or a reset state. Those skilled in the art understand that other NOR gates are also coupleable to the other NOR gates 322, 324, 326, 328, and 330. Whatever NOR gate the power on reset is coupled to, this is the default state, and is known by the data bus transmitter 110.

When performing a power-on or reset (POR), the signal is first inverted by the input of the NOR gate 320 when the signal is input into the NOR gate 320. Therefore, the output of the NOR gate 320 is positive and the "+=state 3" is by definition positive.

The "=Set Early" signals for "3""5" and so on, are each fed into a NOR gate 331 from the decoder state logic 250. The NOR/NAND gate pairs 320/324, 322/335 324/336, 326/337, 328/338, and 300/339 form six state latches, one of which is set at any one time, to establish one of the six states "3", "5", "6", "9", "A", or "C". The positive-active state signals are taken from the midpoints of these latches (between the NOR and the NAND gates). As is understood by those of skill in the art, using a NOR/NAND pair in such a manner creates an "overriding set latch," in which a negative SET signal at the NOR gate input will override a negative RESET at the NAND input as far as the positive output from the midpoint of the latch is concerned.

In the POR condition, NAND gates 334–339 receive a negative input, and also NOR gate 320. After a suitable reset interval, these inputs are removed, leaving only the "State 3" latch set. Typically, in FIG. 3B, one of the six "–=Set n Early" signals will be asserted, followed by the corresponding "–=Set n Late." The former will (after a delay through NOR gate 331 and inverter 332), apply a RESET to all of the six latches. However, the "–=Set n Late" will also apply an overriding set to one of the six latches corresponding to the next gate, provided the delay between the "–=Set n Early" and "–=Set n Late" signals is sufficient.

Figure 5:
FIG. 5 illustrates a logic timing diagram between the various logic blocks and how they relate to one another.

Turning briefly to FIG. 5, illustrated is a logic time diagram between the various logic blocks and how they relate to one another, with the curved arrows denoting the next transition. As illustrated in FIG. 5, if all logic gates have the same unit time delay, the delay block 394, 375, 378, 381, 384 and 387 all have a delay of 4 time units, and the initial state of the logic is state "3" latch set, wherein the bus lines 0 and 1 are negative and bus lines 2 and 3 are positive.

If a differential transition arrives on bus lines 1 and 2 such that bus line 1 becomes positive and bus line 2 becomes negative, the receiver 308 in FIG. 3A detects this, and its output "+=line2>1" will become positive. All signal timings described in this and the subsequent paragraph will be referenced as delays from this instant. After 1 time unit of delay, the output "–=3 to 5", of NAND 341 of FIG. 3C goes negative, since its other input "+=State 3" is also positive. The "–=Set 5 Early" signal then goes negative after 2 more delays through NOR GATE 396 and inverter 398 of FIG. 3D. This is then 3 time unit delays from the reference instant. The "–=Set 5 Late" signal goes negative 7 time units delays from the reference instant. After a further 2 delays through blocks 331 and 332 of FIG. 3B, the output of 332 goes negative (5 time unit delays from the reference instant), applying a reset to all the state latches. This will cause the "+=State 3" output from state latch "3" in FIG. 3B to go negative after two more delays through blocks 334 and 320 (7 time unit delays from the reference instant). This completes the removal of the initial state "3".

However, the "–=Set 5 Late" signal (which arrived at NOR gate 332 in FIGURE 3B 7 time unit delays from the reference instant), will set the state "5" latch instead, the "+=State 5" output of block 322 of this latch becoming positive after a further unit delay (8 time unit delays from the reference instant). Once the "+=State 3" signal becomes negative, the "–=3 to 5" signal will become positive after 1 more delay through block 341 in FIG. 3C (8 time unit delays from the reference instant), and this in turn causes the "–=Set 5 Early" signal from block 374 or FIG. 3D to go positive 10 time unit delays from the reference instant. This completes the operation of the state logic in detecting a transition from an initial state of "3" to a "5" state, and the state logic remains quiescent until a new transition arrives on the input bus lines. Similar timing considerations apply to the other possible state transitions.

Figure 3C:
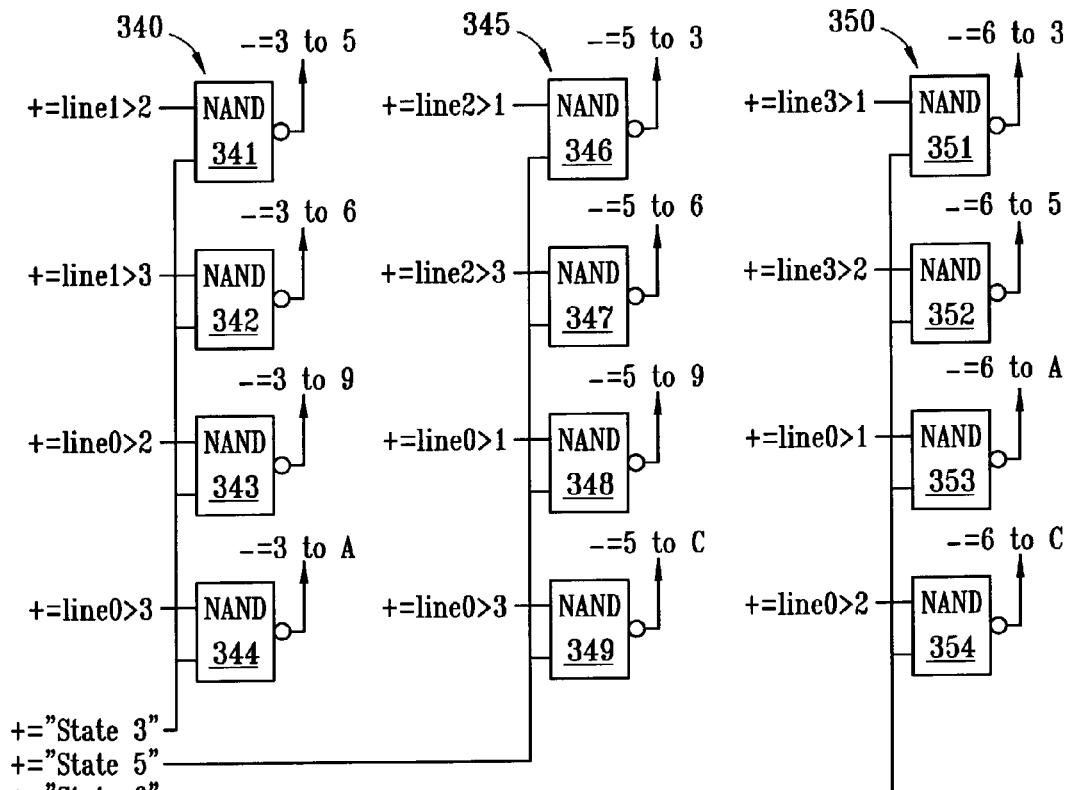
FIG. 3C schematically depicts state shifting decode logic.
Figure 3C:
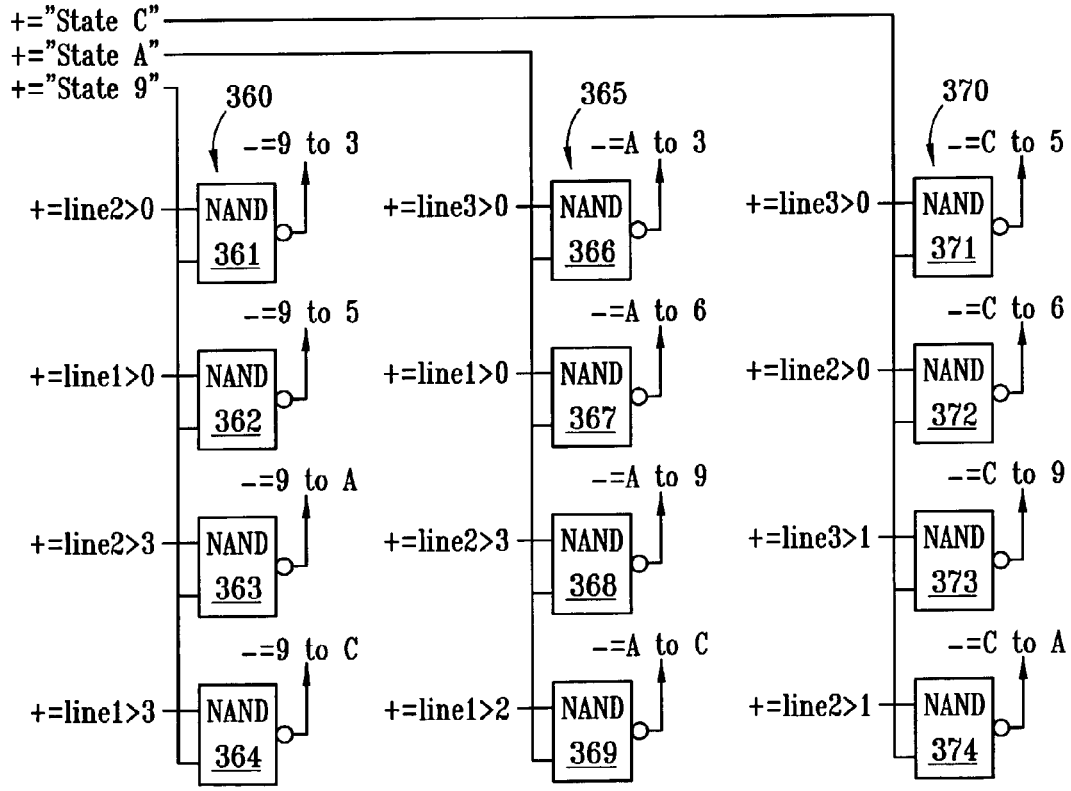

Turning now to FIG. 3C, illustrated is a plurality of arrays of NAND gates. Each array 340, 345, 350, 360, 365, and 370 of NAND gates is associated with a state, and is enabled when that state is latched on in FIG. 3B. For instance, if state "3" is latched on, NANDs 341, 342, 343, and 344 of NAND array 340 are enabled. If state "6" is latched on, NANDS 351, 352, 353, and 354 of NAND array 350 are enabled.

In FIG. 3C, the output of the various combinations of the differential amplifiers 302, 304, 306, 308, 310, and 312 are used as input into the individual NANDs of the various arrays of NAND gates 340, 345, 350, 360, 365, and 370. Each differential output represents the change from one state to another state. For instance, if the state is state "3", NAND array 340 is enabled. If the differential signal is that bus line 1 is now greater than line 2, this represents a transition from the bus-line logic-levels of (0,0,1,1) to (0,1,0,1) and represents a change from "state 3 to "state 5", and NAND gate 341 is enabled. If the differential input represents instead that bus line 0 is now greater than bus line 3, this represents a change from (0,0,1,1) to (1,0,1,0) and represents a change from state "3" to state "A", and NAND gate 344 is enabled.

In FIG. 3C, allowable transitions from state to state are illustrated. The outputs of all NAND gates in FIG. 3C are transmitted to the decode logic in FIGS. 3D and 3E. In the illustrated embodiment of FIG. 3C, a NAND gate is active when its logical output is negative.

Figure 3D:
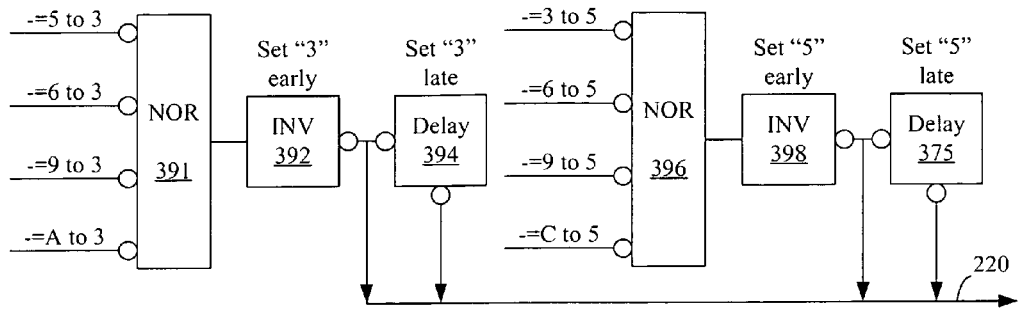
FIG. 3D schematically depicts state decode logic.
Figure 3D:
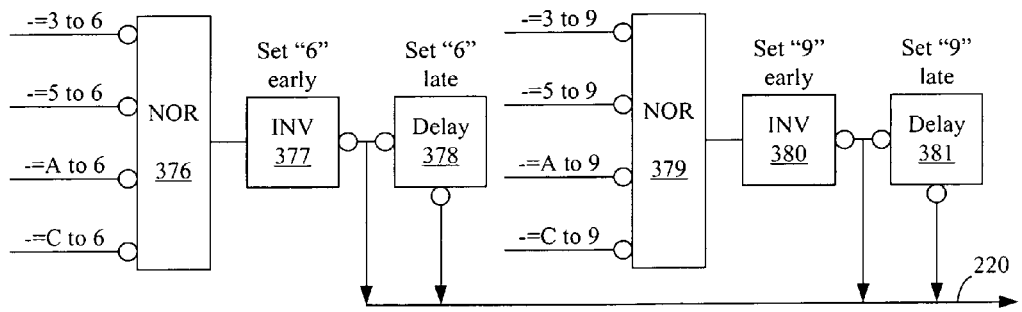
Figure 3D:
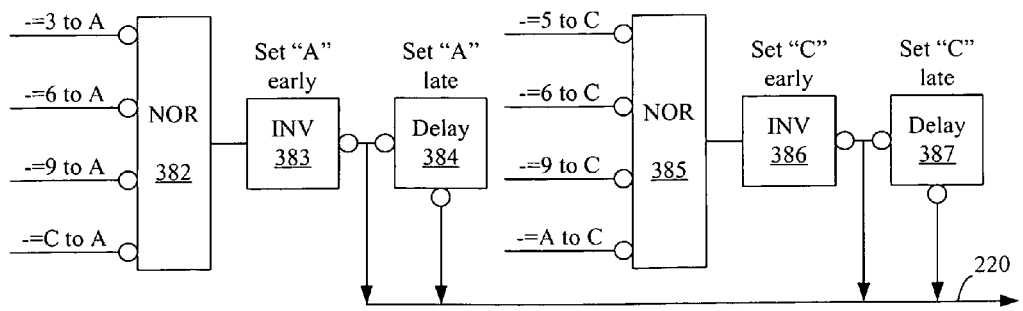

Turning now to FIG. 3D, disclosed is state decode logic for the bus line transitions as generated in FIG. 3C. Each NOR gate 391, 396, 376, 379, 382, and 385 is associated with a final transition state. For example, NOR gate 391 receives all of the possible state transitions end as state "3", NOR 396 receives all states that end as state "5", and so on. Therefore, if there is a transition to a state "3", NOR gate 391 outputs a positive signal. If there is a transition to state "5", NOR gate 396 goes positive, and so on. The output of every NOR gate 391, 376, 379, 382, and 385 is inverted by its corresponding inverter, inverters 371, 398, 377, 380, 383, and 386. These form the "−=set early" signal. The signals are further delayed by delay elements 372, 375, 378, 381, 384, and 387. In one embodiment, the delay elements comprise an even number of inverters.

Figure 3E:
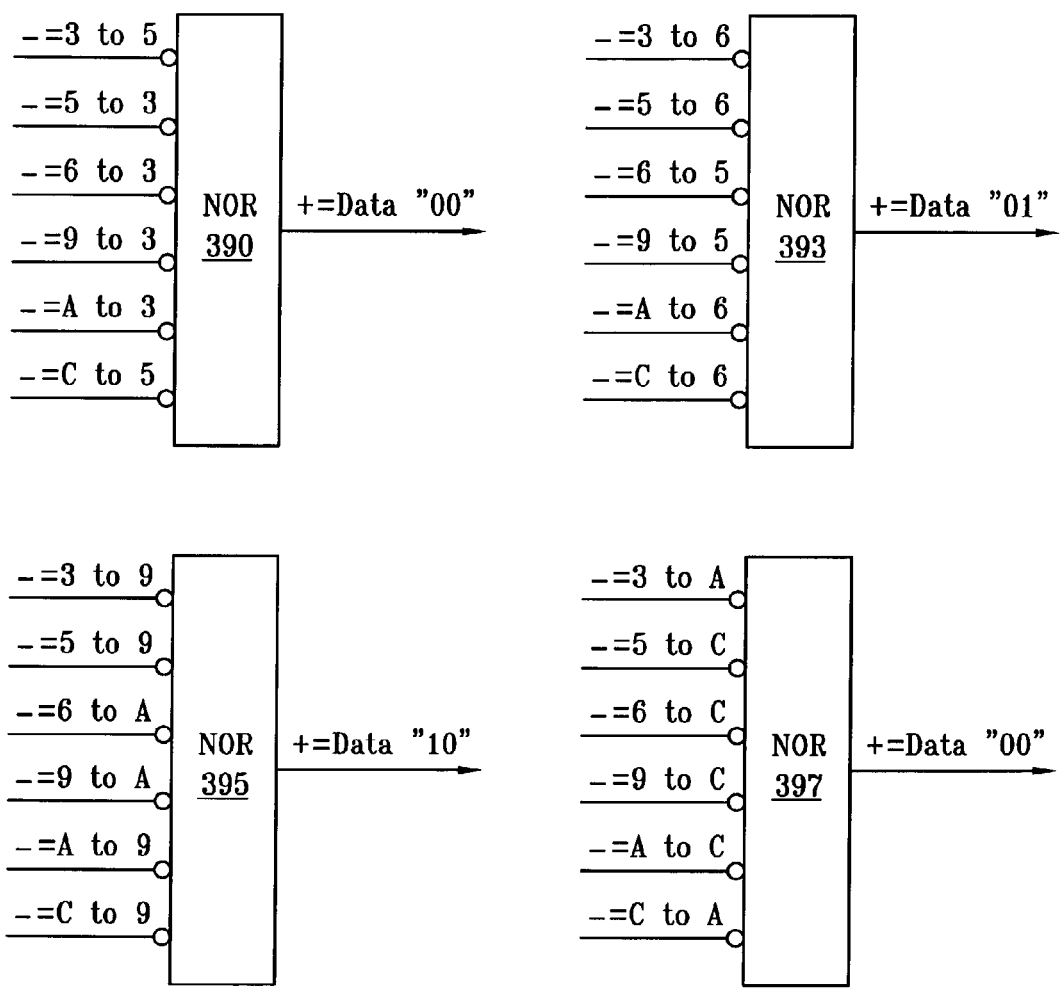
FIG. 3E schematically depicts data conversion logic.

Turning now to FIG. 3E, disclosed is data conversion logic for converting state transitions into a recognizable 2 bit packet of data for the six state latches of FIG. 3B. FIG. 3E discloses four NOR gates 390, 393, 395 and 397. According to Table 1, an allowable state transition represents the transmission of 2 bits of data. In FIG. 3E, any transition from "3 to 5", "5 to 3", "6 to 3", "9 to 3", "A to 3" or "C to 5" represents the transmission of the 2 bits of data, "00", as the NOR gate 390 will go positive for any of these events. Any transition from "3 to 6", "5 to 6", "6 to 5", "9 to 5", "A to 6" or "C to 6" represents the transmission of the 2 bits of data, "01", as the NOR gate 393 will go positive for any of these events. Similar logic is applied to the inputs of NOR gates 395 and 397. These transitions are output as data out, which is a reconstruction of data in.

Figure 4:
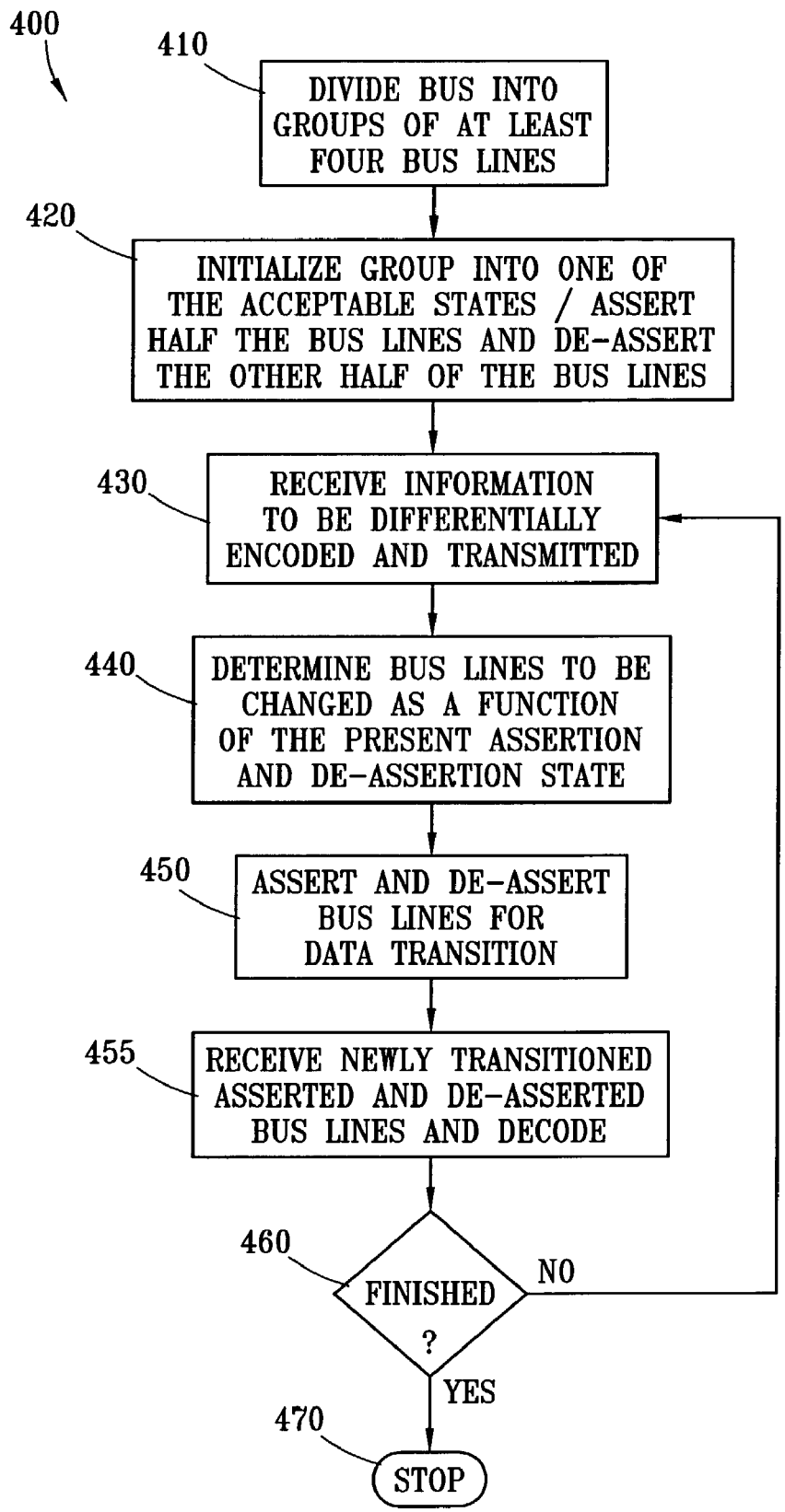
FIG. 4 illustrates a method flow diagram for employing a differential form of transitional coding.

FIG. 4 illustrates a flow chart depicting steps that may be performed by the data bus system. In step 410, the data bus transmitter 110 and the DB receiver 180 divide the bus lines into at least one bus group 163 having at least four bus lines. In a further embodiment, the bus lines are an even number. Both the data bus transmitter 160 and the data bus receiver 180 are configured to send and receive the same sets and groups of bus lines. In one embodiment, the data bus transmitter 110 and the data bus receiver 180 communicate configuration information through the control line 170.

In step 420, the data bus transmitter 110 initializes a bus-line group 163, 165 into any one of 6 acceptable states (0,0,1,1); (0,1,0,1); (0,1,1,0); (1,0,0,1); (1,0,1,0) or (1,1,0,0). In a further embodiment, the data bus receiver 180 is initialized into the state (0,0,1,1) by the decode transition logic 230. This initial state is also captured by the state latch 290.

In step 430, the data bus transmitter 130 receives the data to be differentially coded and transmitted through the first and second bus line group 163, 165 through data in. In step 440, the differential encoding circuitry 120 determines which bus lines are to be transitioned, one transition per pair of asserted and de-asserted bus lines, as a function of both the present state of the bus-lines of the bus line group 163 and the new input data. In one embodiment, this decision is represented by Table 1. Those of skill in the art understand that the differential encoding circuitry 120 can comprise hardware, software, firmware, and so on.

In step 450, the data bus transmitter 110 differentially transmits the encoded data over the bus line group 163. In step 455, the data bus receiver 180 receives the bus-line group 163, which comprises both the transitioned and non-transitioned bus lines. The data bus receiver 180 then decodes the data that was encoded by the transmitter 110 through use of the appropriate differential amplifiers, NAND gates, de-multiplexer, and so on.

In step 460, the method 400 determines whether there is any more data to be encoded by the DB transmitter 110. If there is more, then the method 400 re-executes step 430, and the DB transmitter 110 receives the information to be differentially encoded and transmitted. If there is no more information to be differentially encoded, the method 400 stops in step 470.

It is understood that the present invention can take many forms and embodiments. For example, although transition coding has been disclosed as employing logic circuitry, those of skill in the art understand that hardware, software, firmware, and so on, can be employed within the scope of the present invention. Accordingly, several variations may be made in the foregoing without departing from the spirit or the scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of embodiments. Accordingly, it is appropriate that the appended claims be construed broadly and in a manner consistent with the scope of the invention.

What is claimed is:

1. A transitional coding differential bus system, comprising:
    a bus transmitter comprising groups comprising four bus lines;
    the bus transmitter employable to assert half the bus lines at a higher voltage and half the bus lines at a lower voltage, thereby defining an asserted set of bus lines and a de-asserted set of bus lines;
    wherein the bus transmitter is also employable to transmit data by differentially driving two bus lines, one bus line per set, by de-asserting one of the bus lines of the asserted set, and asserting one of the bus-lines of the de-asserted set; and
    four or more differential amplifiers coupled to four or more AND gates, wherein the differential amplifiers are functionally coupled to the transmitted signals of the bus transmitter.

2. The system of claim 1, further comprising a state latch coupled to the transmitted data.

3. The system of claim 2, wherein the state latch is adapted to transmit a signal.

4. A method for encoding data on a differential bus system having at least a bus and a transmitter and a receiver coupled thereto, comprising:
    dividing the bus into at least one group, the group comprising an even number of bus lines;
    establishing a finite set of allowed states for the group, wherein each allowed state always comprises one-half asserted bus lines and one-half de-asserted bus lines;
    initializing the group to a first state comprising one of the established finite set of allowed states;
    receiving, by the transmitter, a first data to be transmitted;
    encoding the received first data by determining a second state comprising one of the established finite set of allowed states other than the first state, in response to the first state, and the received first data, and a set of predetermined encoding rules;
    wherein the set of predetermined encoding rules comprise a set of allowable transitions from a particular first state to a particular second state, wherein the set of allowable transitions comprise asserting only one of the one-half de-asserted bus lines and de-asserting only one of the one-half asserted bus lines, wherein a particular allowable transition from a particular first state to a particular second state represents a particular data value; and
    transitioning the group to the determined second state.

5. The method as recited in claim 4, further comprising:
receiving, by the transmitter, a second data to be transmitted;
encoding the received second data by determining a third state comprising one of the established finite set of allowed states other than the second state, in response to the second state, and the received second data, and the set of predetermined encoding rules; and
transitioning the group to the determined third state.

6. The method as recited in claim 5, further comprising:
receiving a plurality of new data in discrete units; and
repeating the steps in claim 2 in response to each new discrete data unit.

7. The method as recited in claim 4, further comprising:
comparing voltages of the bus lines to determine the first state;
identifying a transition of the group of bus lines to the second state;
comparing voltages of the bus lines to determine the second state; and
decoding the first data transmitted in response to the determined first state and the determined second state.

8. The method as recited in claim 7, wherein the transmitter performs the steps in claim 4 and wherein the receiver
compares voltages of the bus lines to determine the first state;
identifies a translation of the group of bus lines to the second state;
compares voltages of the bus lines to determine the second state; and
decodes the first data transmitted in response to the determined first state and determined second state.

9. The method as recited in claim 4, wherein the group comprises four bus lines, and wherein the finite set of allowed states comprises two asserted bus lines and two de-asserted bus lines of the four bus lines.

10. The method as recited in claim 4, further comprising two or more groups.

11. The method as recited in claim 4, wherein encoding the received first data further comprises:
determining a data value associated with the received first data;
identifying a predetermined allowable transition from the first state that indicates the determined data value; and
identifying the second state in response to the identified predetermined allowable transition.

12. The method as recited in claim 4, further comprising:
comparing voltages of the bus lines to determine a differential signal;
identifying a pre-transitional state in response to the differential signal; storing the pre-transitional state;
identifying a transition from the pre-transitional state in response to the differential signal and the pre-transitional state;
identifying a post-transitional state in response to the identified transition;
storing the post-transitional state; and
decoding the first data transmitted in response to the pre-transitional state and the post-transitional state.

13. A system, comprising:
a differential receiver coupled to a bus, the bus divided into at least one group, the group comprising an even number of bus lines, the group configured with a finite set of allowed states, wherein each allowed state always comprises one-half asserted bus lines and one-half de-asserted bus lines;
the differential receiver configured to compare voltages of the bus lines to determine at least one of the finite set of allowed states of the group;
a decode transition logic coupled to the differential receiver and configured to determine whether a transition has been made from a pre-transition allowed state to a post-transition allowed state;
a state register coupled to the decode transition logic and configured to store the pre-transition allowed state;
a decode state logic coupled to the decode transition logic and the state register and configured to determine a particular transition from a finite set of allowed transitions in response to the pre-transition allowed state and post-transition allowed state;
a decode data logic coupled to the decode transition logic and configured to determine a decoded data in response to the determined transition and a set of predetermined encoding rules; and
wherein the set of predetermined encoding rules comprise the set of allowable transitions, wherein the set of allowable transitions comprise asserting only one of the one-half de-asserted bus lines and de-asserting only one of the one-half asserted bus lines, wherein a particular allowable transition from a particular pre-transition state to a particular post-transition state represents a particular data value.

14. The system as recited in claim 13, further comprising:
a transmitter coupled to the bus; and
the transmitter configured to initialize the group to the pre-transition state, to receive a first data to be transmitted, to encode the received first data by determining a post-transition state comprising one of the established finite set of allowed states other than the pre-transition state, in response to the pre-transition state, and the received first data, and the set of predetermined encoding rules, and to transition the group to the determined post-transition state.

15. The system as recited in claim 13, wherein the group comprises four bus lines, and wherein the finite set of allowed states comprises two asserted bus lines and two de-asserted bus lines of the four bus lines.

16. The system as recited in claim 13, further comprising two or more groups.

17. The system as recited in claim 14, further comprising a control line coupled to the transmitter and the receiver.

18. The system as recited in claim 13, wherein at least a portion of the bus is external to an integrated circuit chip.

19. The system as recited in claim 14, wherein the transmitter and the receiver are further configured to measure and compensate for signal propagation, skew assertion, and skew de-assertion times.

20. A processor for encoding data on a differential bus system having at least a bus and a transmitter and a receiver coupled thereto, the processor including a computer program comprising:
computer code for dividing the bus into at least one group, the group comprising an even number of bus lines;
computer code for establishing a finite set of allowed states for the group, wherein each allowed state always comprises one-half asserted bus lines and one-half de-asserted bus lines;
computer code for initializing the group to a first state comprising one of the established finite set of allowed states;
computer code for receiving, by the transmitter, a first data to be transmitted;

computer code for encoding the received first data by determining a second state comprising one of the established finite set of allowed states other than the first state, in response to the first state, and the received first data, and a set of predetermined encoding rules;

wherein the set of predetermined encoding rules comprise a set of allowable transitions from a particular first state to a particular second state, wherein the set of allowable transitions comprise asserting only one of the one-half de-asserted bus lines and de-asserting only one of the one-half asserted bus lines, wherein a particular allowable transition from a particular first state to a particular second state represents a particular data value; and computer code for transitioning the group to the determined second state.

21. The processor as recited in claim 20, further comprising:

computer code for comparing voltages of the bus lines to determine the first state;

computer code for identifying a transition of the group of bus lines to the second state;

computer code for comparing voltages of the bus lines to determine the second state; and computer code for decoding the first data transmitted in response to the determined first state and the determined second state.

* * * * *

UNITED STATES PATENT AND TRADEMARK OFFICE
CERTIFICATE OF CORRECTION

PATENT NO. : 7,003,605 B2 Page 1 of 1
APPLICATION NO. : 10/242522
DATED : February 21, 2006
INVENTOR(S) : David John Craft and Charles Ray Johns It is certified that error appears in the above-identified patent and that said Letters Patent is hereby corrected as shown below:

Col. 7, Line 32   Delete " "= Set Early" " and insert --"- = Set Early"--
Col 7, Line 32    Delete " "3""5" " and insert -- "3", "5"--

Signed and Sealed this

Fifth Day of September, 2006

JON W. DUDAS
*Director of the United States Patent and Trademark Office*